（12）United States Patent
Kuribayashi et al.

(10) Patent No.: US 11,859,655 B2
(45) Date of Patent: Jan. 2, 2024

(54) LINKING MECHANISM

(71) Applicant: HI-LEX CORPORATION, Hyogo (JP)

(72) Inventors: Ryochi Kuribayashi, Tochigi (JP); Satoshi Hirose, Hyogo (JP)

(73) Assignee: Hi-Lex Corporation, Hyogo (JP)

( * ) Notice: Subject to any disclaimer, the term of this patent is extended or adjusted under 35 U.S.C. 154(b) by 0 days.

(21) Appl. No.: 17/778,892

(22) PCT Filed: Nov. 26, 2020

(86) PCT No.: PCT/JP2020/043919
§ 371 (c)(1),
(2) Date: May 23, 2022

(87) PCT Pub. No.: WO2021/106971
PCT Pub. Date: Jun. 3, 2021

(65) Prior Publication Data
US 2022/0412395 A1 Dec. 29, 2022

(30) Foreign Application Priority Data
Nov. 26, 2019 (JP) .................. 2019-213658

(51) Int. Cl.
F16C 1/10 (2006.01)
(52) U.S. Cl.
CPC .............. F16C 1/101 (2013.01); F16C 1/106 (2013.01); F16C 2326/01 (2013.01)
(58) Field of Classification Search
CPC .. F16C 1/101; F16C 1/106; F16C 1/10; F16C 1/262
See application file for complete search history.

(56) References Cited

U.S. PATENT DOCUMENTS 5,138,898 A * 8/1992 Pospisil .................. F16C 1/106
24/136 L
8,857,288 B2 * 10/2014 Sano ....................... F16C 1/101
74/502.4

(Continued)

FOREIGN PATENT DOCUMENTS

JP 2015-145685 A 8/2015
JP 2015-224767 A 12/2015
KR 10-0774759 B1 11/2007

OTHER PUBLICATIONS

International Search Report PCT/JP2020/043919 dated Feb. 22, 2021.

Primary Examiner — Thomas C Diaz
(74) Attorney, Agent, or Firm — Shih IP Law Group, PLLC.

(57) ABSTRACT

A coupling mechanism includes a cable including a cable end at an end portion, a slider including a coupling part coupled with the end portion, and a joint case including a slider housing space, wherein the coupling part includes a cable end housing part, and a separation restraining part restraining cable separation from the slider, and wherein the separation restraining part includes an installation space where the cable extended from the cable end is disposed with the cable coupled with the slider, an inlet opening in a direction perpendicular to a cable axis and allowing the cable to move in the direction and pass through the inlet, a passage part allowing the cable to move to the installation space through the inlet, and a first restriction part blocking a cable movement direction when the cable in the installation space moves in a direction parallel to a passage part's extending direction.

4 Claims, 5 Drawing Sheets

(56) References Cited

U.S. PATENT DOCUMENTS

| | | | |
|---|---|---|---|
| 10,138,924 B2 * | 11/2018 | Sano | F16C 1/101 |
| 10,451,103 B2 * | 10/2019 | Yoshida | F16C 1/101 |
| 2017/0198744 A1 | 7/2017 | Sano | |

* cited by examiner

LINKING MECHANISM

TECHNICAL FIELD

The present invention relates to a coupling mechanism.

BACKGROUND ART

In the related art, a coupling mechanism is known in which a cable connected with an operation member (hereinafter appropriately referred to as "operation side cable") and a cable connected with an actuation member (hereinafter appropriately referred to as "actuation side cable") are coupled, and the operating force of the operation member is transmitted to the actuation member through these coupled cables (see, for example, "PTL 1"). The coupling mechanism mainly includes a slider, a joint case that houses the slider in a slidable manner and the like, and the operation side cable is coupled at the end portion on the side opposite to operation member with one end portion of the slider in the sliding direction, and in addition, the actuation side cable is coupled at the end portion the side opposite to the actuation member side with the other portion of the slider in the sliding direction.

Further, by pulling the operation side cable to the operation member side with the operating force of the operation member, the slider slides in the joint case together with the actuation side cable. In this manner, the operating force of the operation member is sequentially transmitted through the operation side cable, the slider, and the actuation side cable, and applied to the actuation member.

Here, at the portion where the cable and the slider are coupled, the cable is coupled with the slider with its end portion extending through the side surface of the slider in the sliding direction. Specifically, in PTL 1 for example, in the side surface on the sliding direction side of the slider (joint piece), a extending portion that opens on the side opposite to the sliding surface side of the joint case (case) and extends in the sliding direction, and a lock part provided in the slider and communicated with the extending portion are provided. In addition, spherical cable ends are provided at the tips of the end portions (the end portion coupled with the operation member or the actuation member, and the opposite end portion) of the cable. In the state where the cable end is locked by the lock part, the end portion of the cable is inserted into and coupled with the protruding portion in the state where it extends through the slider.

CITATION LIST

Patent Literature

PTL 1
Japanese Patent Application Laid-Open No. 2015-145685

SUMMARY OF INVENTION

Technical Problem

Incidentally, in the case where the cable coupled with the slider is wired in directions three-dimensionally different from each other with respect to the sliding direction of the slider and the operating force of the operation member is transmitted to the actuation member, external forces in any three-dimensional directions with respect to the slider are applied to the end portion of the cable, and consequently the end portion of the cable may be moved toward the opening of the above-mentioned extending portion depending on the direction of the external force, causing dropping from the slider.

In view of this, as a means for preventing such dropping of the end portion of the cable from the extending portion of the slider, it is conceivable to adopt a configuration in which only the gap of the opening at the extending portion is set to be slightly smaller than the diameter of the cable such that even when the end portion of the cable is moved toward the opening due to the above-mentioned external force, it is less easily dropped from the slider through the opening, for example. However, in such a configuration, when the end portion of the cable is pushed and assembled to the extending portion of the slider through the opening, it receives a drag from the opening, while drop off of the end portion of the cable from the slider is prevented. Consequently, the mass productivity is deteriorated if assembling to the slider is carefully performed so as not to cause buckling and the like at the end portion of the cable, whereas the degree of freedom of wiring is deteriorated if the diameter of the cable is increased so as not to reduce the rigidity of the cable.

An object of the present invention is to provide a coupling mechanism that can easily assemble a cable to a slider slidably housed in a joint case, and can prevent dropping of the cable from the slider.

Solution to Problem

The problems to be solved by the present invention is as described above, and the following describes a solution to the problem.

A coupling mechanism according to an embodiment of the present invention includes: a cable including a cable end at an end portion of the cable; a slider including a coupling part configured to be coupled with the end portion of the cable; and a joint case including a housing space configured to house the slider in a slidable manner. The coupling part includes: a cable end housing part configured to house the cable end, and a separation restraining part configured to restrain separation of the cable from the slider. The separation restraining part includes: an installation space extended in a sliding direction of the slider, the installation space being a space in which the cable extended from the cable end is disposed in a state where the cable is coupled with the slider, an inlet configured to open in a direction perpendicular to an axis of the cable with a gap equal to or greater than a wire diameter of the cable, and allow the cable to move in the direction perpendicular to the axis and to pass through the inlet, a passage part communicated with the installation space and the inlet, and configured to allow the cable to move to the installation space through the inlet, and a first restriction part configured to block a movement direction of the cable when the cable disposed in the installation space moves in a direction parallel to an extending direction of the passage part.

Advantageous Effects of Invention

Effects of the present invention are as follows. Specifically, with the coupling mechanism of the present invention, the end portion of the cable can be easily coupled, and after it is coupled with the slider, dropping of the cable from the slider can be prevented.

BRIEF DESCRIPTION OF DRAWINGS

FIG. 2A is a diagram as viewed from above, FIG. 2B is a diagram as viewed from front in the direction of arrow X1 of FIG. 2A, and FIG. 2C is a diagram illustrating a cross section as viewed from front in the direction of arrow X2 of FIG. 2A;

FIG. 3A is a diagram illustrating a state where one cable that has passed a passage part reaches an installation space, FIG. 3B is a diagram illustrating a state where the other cable comes closer to the inlet by a rotation of the coupling end in a cable end housing part, FIG. 3C is a diagram illustrating a state where the other cable moves from the passage part to the installation space by a further rotation of the coupling end in the cable end housing part, and FIG. 3D is a diagram illustrating a state where both one cable and the other cable are disposed in the installation space;

FIG. 4A is a diagram as viewed from above, and FIG. 4B is a diagram as viewed from front in the direction of arrow X3 of FIG. 4A; FIG. 5A is a diagram illustrating a state where one cable that has passed a passage part reaches an installation space, FIG. 5B is a diagram illustrating a state where one cable is moved in a direction away from the passage part by slight sliding of a coupling end in a cable end housing part, FIG. 5C is a diagram illustrating a state where the other cable passes through the inlet and enters the passage part by a rotation of the coupling end in the cable end housing part, and FIG. 5D is a diagram illustrating a state where both one cable and the other cable are disposed in the installation space by a further rotation of the coupling end in the cable end housing part.

DESCRIPTION OF EMBODIMENTS

Figure 1:
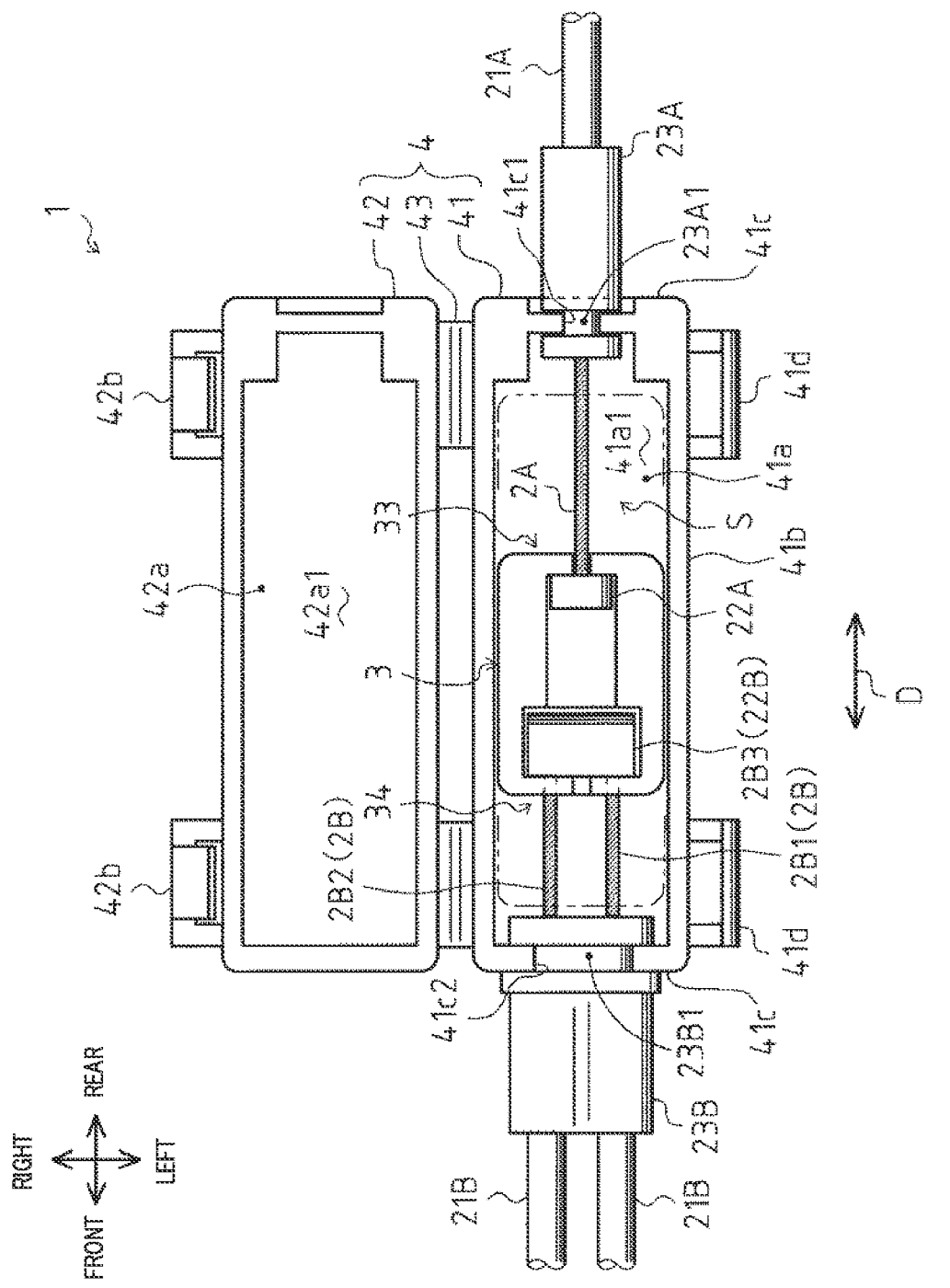
FIG. 1 is a diagram illustrating an entire configuration of a coupling mechanism according to an embodiment of the present invention, with a joint case open.

Next, a configuration of coupling mechanism 1 according to an embodiment of the present invention is described with reference to FIGS. 1 to 5. Note that in the following description, the arrow directions illustrated in FIGS. 1 to 5 define the up-down direction, front-rear direction, and left-right directions of coupling mechanism 1 (or coupling mechanism 101 of the other embodiment) for the sake of convenience. Here "up" in the above-mentioned "up-down direction" is a relative position when sliding surface 31a is assumed as the lower side with respect to sliding surface 31a of slider 3 that slides with bottom surface 41a1 of bottom side member 41 with an operation of inner cables 2A and 2B, not the upper and lower side of the state where coupling mechanism 1 is attached to an attaching object such as a vehicle body. The same applies to "down" in the above-mentioned "up-down direction". In addition, in the following description, the direction of arrow D illustrated in FIGS. 1, 2A, and 4A defines the sliding direction of slider 3 (or slider 103 of the other embodiment) with respect to joint case 4 for the sake of convenience.

Coupling mechanism 1 of the present embodiment is a mechanism for transmitting the operating force of the operation member to the actuation member, and couples one cable attached to the actuation member or the operation member and the other cable attached to the actuation member or the operation member. That is, coupling mechanism 1 couples at least two types of cables, 2A and 2B, and transmits an operating force applied to one inner cable 2A to the other cable 2B (or transmits an actuation power applied to the other cable 2B to one inner cable 2A) as illustrated in FIG. 1, for example.

One end portion (for example, a front end portion in the present embodiment) of inner cable 2A is connected to coupling mechanism 1 side (slider 3 side described later), and the other end portion (for example, a rear end portion in the present embodiment) thereof is directly or indirectly connected to an operation member (not illustrated) for applying an operating force to inner cable 2A. In addition, one end portion (for example, a rear end portion in the present embodiment) of cable 2B is connected to coupling mechanism 1 side (slider 3 side), and the other end portion (for example, a front end portion in the present embodiment) thereof is directly or indirectly connected to an actuation member side member (not illustrated).

The actuation member is operated when an operating force applied to the operation member is transmitted to cable 2B through inner cable 2A and slider 3. Here, it suffices that the operation member can operate inner cable 2A, and the operation member may be, for example, a member that is manually operated such as a shift lever and a handle, or a member for pulling operation of cables through electric driving. In addition, the actuation member is not limited as long as it is remotely operated by the operation member operated, and may be, for example, a locking mechanism in an opening closing member such as a vehicle hood, a trunk, and a fuel lid, and a seat locking mechanism for locking the reclining state of seats.

It suffices that inner cables 2A and 2B can transmit the operating force applied by the operation member to the actuation member, and, for example, publicly known control cables may be adopted. Here, while the inner cable inserted to the outer casing is adopted as described later in the present embodiment, this is not limitative, and a control cable composed only of inner cable 2 may also be adopted.

Configuration of Coupling Mechanism 1

First, a configuration of coupling mechanism 1 of the present embodiment is described with reference to FIG. 1. Coupling mechanism 1 mainly includes inner cables 2A and 2B as an example of a cable, slider 3 coupled with end portions of inner cables 2A and 2B, joint case 4 including housing space S for housing slider 3 in a slidable manner, and the like. In addition, slider 3 includes bottom surface part 31 (see FIG. 2B) including sliding surface 31a for sliding on joint case 4, and slides inside housing space S of joint case 4 through a pulling operation of any of inner cables 2A and 2B.

Inner cables 2A and 2B are members for transmitting, through slider 3, an operating force applied by the operation member (not illustrated) composed of a seat lever or the like, to the actuation member (not illustrated) composed of a seat locking mechanism or the like. Inner cables 2A and 2B are inserted to outer casings 21A and 21B, respectively, in a slidable manner. In addition, one end portion (for example, a front end portion in the present embodiment) of outer casing 21A and one end portion (for example, a rear end portion in the present embodiment) of outer casing 21B are both fixed to joint case 4, and portions between both end portions of inner cables 2A and 2B are protected by outer casings 21A and 21B.

Cable ends 22A and 22B are provided at one end portion (for example, a front end portion in the present embodiment) of inner cable 2A and one end portion (for example, a rear end portion in the present embodiment) of inner cable 2B, respectively, and inner cables 2A and 2B are coupled with slider 3 through cable ends 22A and 22B. In addition, although not shown in the drawings, cable ends (not illustrated) are also provided at the other end portion (for example, a rear end portion in the present embodiment) of inner cable 2A and the other end portion (for example, a front end portion in the present embodiment) of inner cable 2B, and inner cable 2A and inner cable 2B are coupled with the operation member and the actuation member, respectively, through the cable ends.

Here, the shapes of cable ends 22A and 22B are not limited as long as inner cables 2A and 2B can be coupled with slider 3 and they have a strength enough to transmit the operating force applied by the operation member to the actuation member through slider 3, and the shape may be any shapes such as spherical, columnar, and rectangular prism shapes. Note that the shapes of cable ends 22A and 22B are described in detail later.

Incidentally, in the present embodiment, one inner cable 2A is extended from slider 3 to one side (for example, the rearward side in the present embodiment) and coupled with the slider 3, and two inner cables 2B are extended from slider 3 to the other side (for example, the forward side in the present embodiment) and coupled with the slider 3. In addition, two inner cables 2B include first inner cable 2B1 and second inner cable 2B2 disposed parallel to each other, and long coupling end 2B3 for coupling first inner cable 2B1 and second inner cable 2B2 at an end portion. Specifically, coupling end 2B3 is cable end 22B provided at inner cable 2B, has a function of coupling inner cable 2B with slider 3, and has a function of coupling first inner cable 2B1 and second inner cable 2B2 with each other in the longitudinal direction.

Here, the number of inner cables 2A and 2B may be appropriately changed in accordance with the usage of coupling mechanism 1. Specifically, as long as a configuration for coupling inner cables through slider 3 is provided, it is possible to adopt a configuration provided with two or more inner cables 2A on one side and two or more inner cables 2B on the other side. It is also possible to adopt a configuration provided with two or more inner cables 2A on one side and one inner cable 2B on the other side. It is also possible to adopt a configuration provided with one inner cable 2A on one side and one inner cable 2B on the other side, for example.

Note that in coupling mechanism 1 of the present embodiment, it is preferable to provide a plurality of inner cables extended on at least one side since it makes easy to maintain the state where the inner cable is locked and coupled with slider 3.

Cable end 22A of inner cable 2A is locked with first coupling part 33 provided at a side part on one side (for example, the rear side in the present embodiment) of slider 3. In this manner, inner cable 2A is coupled with slider 3. In addition, cable end 22B of inner cable 2B is locked with second coupling part 34 provided at a side part on the other side (for example, the front side in the present embodiment) of slider 3. In this manner, inner cable 2B is coupled with slider 3. In this manner, slider 3 is a member for coupling inner cable 2A on one side and inner cable 2B on the other side. In addition, slider 3 transmits, to inner cable 2B on the other side, an operating force applied to inner cable 2A on one side by the operation member by coupling inner cable 2A on one side and inner cable 2B on the other side.

Slider 3 is housed inside housing space S of joint case 4 in a slidable manner in such a manner that the operating three applied by the operation member is transmitted to the actuation member through inner cables 2A and 2B. For example, in the present embodiment, when inner cable 2A is operated and pulled rearward by the operation member, slider 3 is pulled by inner cable 2A to slide rearward inside housing space S of joint case 4 since it is locked with cable end 22A of inner cable 2A. As a result, inner cable 2B with cable end 22B locked with slider 3 is also pulled rearward together with slider 3. In this manner, the operating force applied by the operation member is transmitted to the actuation member through inner cable 2A, slider 3, and inner cable 2B in this order.

Slider 3 has, for example, a substantially cuboid shape in its entirety in the present embodiment, and can be coupled with cable end 22A of inner cable 2A and cable end 22B of inner cable 2B through first coupling part 33 provided at the rear side part and second coupling part 34 provided at the front side part as described above. In addition, slider 3 is configured to be slidable in sliding direction D (for example, the front-rear direction in the present embodiment) inside housing space S of joint case 4.

Here, the entire shape of slider 3 is not limited to the present embodiment, and may be appropriately modified in accordance with the usage as long as it can be coupled with inner cables 2A and 2B and it can slide in movement direction D inside housing space S of joint case 4. Note that slider 3 will be described in detail later.

Joint case 4 is a housing member that houses slider 3 in a slidable manner. Joint case 4 includes bottom side member 41 provided with bottom surface 41a1 and lid side member 42 provided with lid surface 42a1, and is configured such that lid side member 42 can open and close with respect to bottom side member 41.

Bottom side member 41 includes bottom part 41a provided with bottom surface 41a1 where slider 3 slide, a pair of side wall parts 41b uprightly provided facing each other on bottom part 41a and extended toward sliding direction D of slider 3, a pair of end wall parts 41c uprightly provided facing each other at both end portions in sliding direction D at bottom part 41a, and the like, and housing space S is composed of bottom part 41a, side wall part 41b, and end wall part 41c.

Further, housing space S is configured such that when inner cable 2A (or inner cable 2B) is operated, slider 3 can slide in the direction of transmitting the operating force to inner cable 2B (or inner cable 2A). In the present embodiment, the pair of side wall parts 41b are provided in parallel with each other with a gap with a size approximately equal to the size of slider 3 in the width direction (a direction parallel to bottom surface 41a1 and orthogonal to sliding direction D) such that slider 3 is linearly guided and slid, and thus housing space S with a substantially cuboid shape extending in sliding direction D of slider 3 is formed.

Note that housing space S has not only a function of guiding the sliding direction of slider 3, but also a function of housing slider 3 and holding the assembling posture of slider 3 when assembling inner cables 2A and 2B to joint case 4, for example.

Lid side member 42 includes lid part 42a including lid surface 42a1 that covers housing space S of bottom side member 41, engagement part 42b that engages with bottom side member 41, and the like, and the state where housing space S is closed is maintained when lid side member 42 is engaged with bottom side member 41. In addition, lid side member 42 is coupled with bottom side member 41 through hinge 43, and is configured to open and close about hinge 43 with respect to the bottom side member 41.

Specifically, engagement part 42b shown as an engage claw is formed in lid side member 42, and the state where housing space S is closed is maintained by engaging engagement pan 42b with engaged pan 41d formed in bottom side member 41 while simultaneously closing housing space S by covering bottom side member 41 with lid side member 42. In this manner, with lid surface 42a1 of lid side member 42, it is possible to prevent slider 3 housed in housing space S of bottom side member 41 from being come out and dropped off from the housing space S.

Note that the configurations of engagement part 42b provided in lid side member 42 and engaged part 41d provided in bottom side member 41 are not limited to the present embodiment, and other engagement structures may be adopted.

In bottom side member 41, first fixing part 41c1 that can engage with casing end 23A provided in the front end portion of outer casing 21A is formed in end wall part 41c provided on one side (for example, the rearward side in the present embodiment) in sliding direction D. The front end portion of outer casing 21A is fixed to joint case 4 without coming off from bottom side member 41 by engaging first fixing part 41c1 and casing end 23A. In addition, in bottom side member 41, second fixing part 41c2 that can engage with casing end 23B provided in the rear end portion of outer casing 21B is formed in end wall part 41c provided on the other side (for example, the forward side in the present embodiment) in sliding direction D. The rear end portion of outer casing 21B is fixed to joint case 4 without coming off from bottom side member 41 by engaging second fixing part 41c2 and casing end 23B.

Here, in the present embodiment, reduced diameter part 23A1 whose cross-sectional diameter is reduced in comparison with other regions is provided at a middle part of casing end 23A in sliding direction D, first fixing part 41c1 is formed in a recessed shape that can engage with the outer periphery of the reduced diameter part 23A1, reduced diameter part 23A1 is engaged with first fixing part 41c1, and thus, outer casing 21A is prevented from coming off from joint case 4. In addition, reduced diameter part 23B1 whose cross-sectional diameter is reduced in comparison with other regions is provided at a middle part of casing end 23B in sliding direction D, second fixing part 41c2 is formed in a recessed shape that can engage with the outer periphery of the reduced diameter part 23B1, reduced diameter part 23B1 is engaged with second fixing part 41c2, and thus, outer casing 21B is prevented from coming off from joint case 4.

Note that the engagement structures of casing ends 23A and 23B and first fixing part 41c1 and second fixing part 41c2 are not limited to the present embodiment, and any configuration can be adopted as long as reliable fixing to joint case 4 without separation from bottom side member 41 can be achieved.

Configuration of Slider 3

Figure 2A:
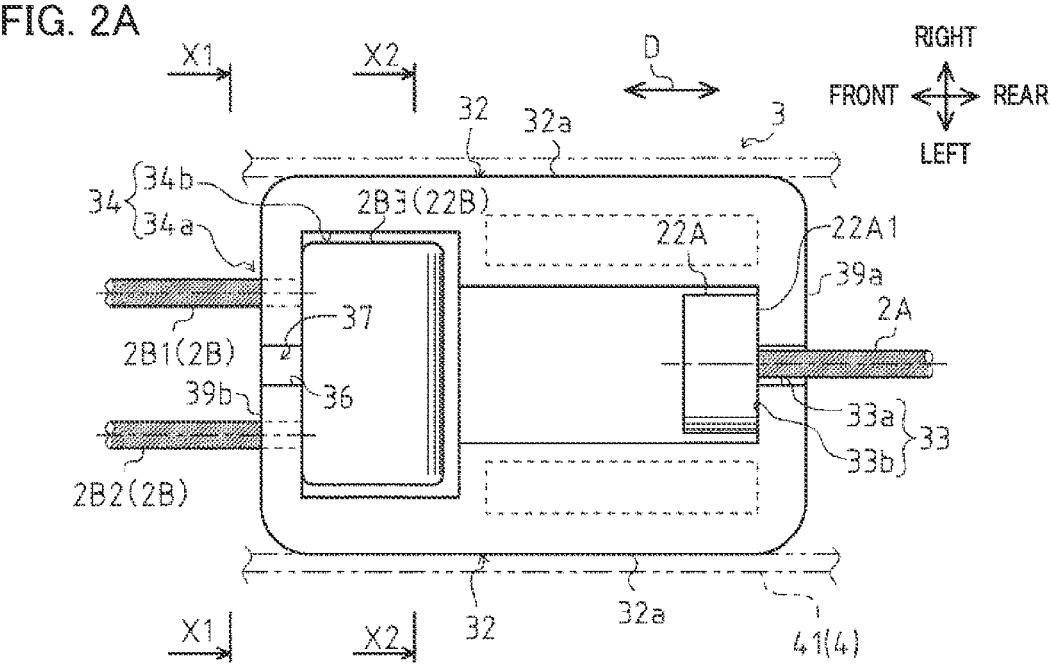
FIGS. 2A to 2C are diagrams illustrating a configuration of a slider provided in the coupling mechanism of FIG. 1.
Figure 2B:
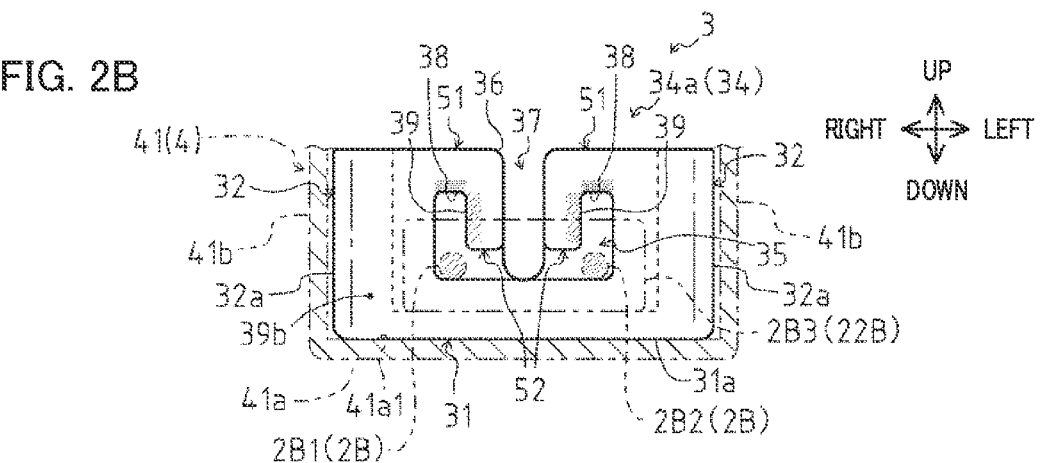

Next, a configuration of slider 3 is described with reference to FIGS. 2A to 2C. Slider 3 includes sliding surface 31a that is slidable on bottom surface 41a1 of bottom side member 41, and a pair of contact surfaces 32a that can make contact with side wall part 41b of bottom side member 41, and first coupling part 33 and second coupling part 34 are provided on the one side (rear side) and the other side (front side) of the sliding surface 31a, respectively. For example, as illustrated in FIGS. 2A and 2B, slider 3 has a substantially cuboid shape in its entirety, and in the state where it is housed in housing space S of joint case 4 (see FIG. 1), the side surface located on bottom surface 41a1 side of bottom side member 41 functions as sliding surface 31a. Further, the pair of side surfaces provided to face side wall part 41b of bottom side member 41 at both sides in the width direction (the direction parallel to bottom surface 41a1 and orthogonal to sliding direction D, and, for example, the left-right direction in the present embodiment) functions as contact surface 32a.

Note that in the present embodiment, sliding surface 31a is formed in a flat shape, but this is not limitative, and it is possible to adopt a configuration in which a recess (or through hole) or the like is provided optionally to reduce the frictional resistance with the bottom surface 41a1 of bottom side member 41, for example.

First coupling part 33 engages with cable end 22A provided at the front end portion of inner cable 2A, and couples the inner cable 2A with slider 3. As illustrated in FIG. 2A for example, first coupling part 33 is composed of first passage part 33a through which inner cable 2A can be inserted, and first cable end housing part 33b communicated with first passage part 33a and in which cable end 22A can be housed.

Figure 2C:
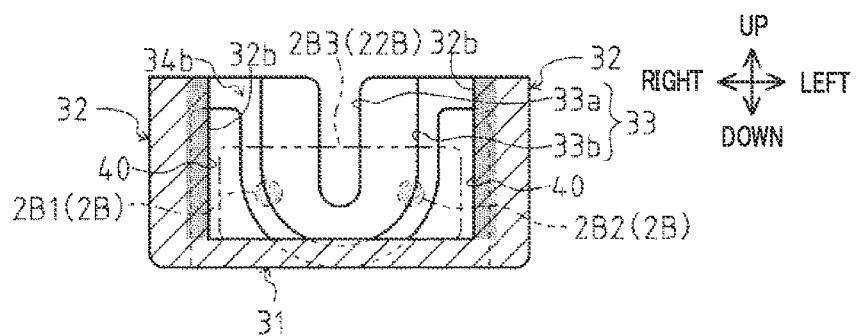

First passage part 33a is formed in a groove shape that extends through rear end surface 39a of slider 3 in sliding direction D, from the top toward the bottom of slider 3 as illustrated in FIG. 2C. In addition, the size (gap) in the width direction (left-right direction) of first passage part 33a is set to a size approximately equal to the wire diameter of inner cable 2A.

First cable end housing part 33b is formed in a recessed shape communicated with first passage part 33a at a rear part in the top surface of slider 3, and its size in the width direction (left-right direction) is set to a size approximately equal to the outer diameter of cable end 22A. Note that first cable end housing part 33b is extended forward so as to be communicated with second cable end housing part 34b described later in the present embodiment, but this is not limitative, and it may be provided separately from second cable end housing part 34b as long as it has a size in the longitudinal direction (the front-rear direction in the present embodiment) that can house at least cable end 22A.

Further, as illustrated in FIG. 2A, inner cable 2A is inserted to first passage part 33a, cable end 22A is housed in first cable end housing part 33b, and rear end surface 22A1 of cable end 22A is brought into contact with end surface 39a (more specifically, the front side of the rear end portion of slider 3 with end surface 39a) of slider 3. Thus, the cable end 22A is engaged with end surface 39a of slider 3, and inner cable 2A is coupled with slider 3 through first coupling part 33.

Note that the configuration of first coupling part 33 is not limited to the present embodiment, and it is possible to adopt a configuration similar to second coupling part 34 described later, or fourth coupling part 134 of slider 103 of the other embodiment, for example.

Second coupling part 34 is an example of an embodiment of the present invention, and engages with cable end 22B provided at the rear end portion of inner cable 2B, and couples the inner cable 2B to slider 3. Second coupling part 34 includes separation restraining part 34a that prevents inner cable 2B from being separated from slider 3, and second cable end housing part 34b that houses cable end 22B.

As illustrated in FIG. 2B, separation restraining part 34a is mainly composed of installation space 35, inlet 36, passage part 37, first restriction part 38, second restriction part 39 and the like.

Installation space 35 is a space where inner cable 2B extended from cable end 22B toward sliding direction D of slider 3 (the forward direction in the present embodiment) is disposed in the state where inner cable 2B is coupled with slider 3. Installation space 35 is a space extending through front end surface 39b of slider 3 in sliding direction D, and is partitioned by bottom surface part 31 including sliding surface 31a provided on bottom part 41a side of joint case 4 (more specifically, bottom side member 41), and a pair of side wall parts 32 including contact surface 32a provided in the direction (the left-right direction in the present embodiment) perpendicular to the extending direction of inner cable 2B in the present embodiment, for example.

As described above, in the present embodiment, two inner cables 2B disposed parallel to each other (more specifically, first inner cable 2B1 and second inner cable 2B2) are provided, and first inner cable 2B1 and second inner cable 2B2 are disposed in installation space 35 in the state where they are separated from each other in the width direction (left-right direction).

Inlet 36 is a gap provided as an entrance for introducing inner cable 2B into installation space 35. Inlet 36 is provided on the upper side of installation space 35, to open in the direction (the left-right direction in the present embodiment) perpendicular to the axis of the inner cable 2B, with a gap equal to or greater than the wire diameter of each inner cable 2B (first inner cable 2B1 or second inner cable 2B2).

Further, inlet 36 is configured to allow first inner cable 2B1 and second inner cable 2B2 to pass through it by sequentially moving each single inner cable 2B (first inner cable 2B 1 or second inner cable 2B2) in the direction (the up-down direction in the present embodiment) perpendicular to the axis.

Note that in the present embodiment, a gap of a pair of top plate parts 51 that makes up first restriction part 38 makes up inlet 36 as described later, for example.

Passage part 37 is a space for guiding each inner cable 2B that has passed inlet 36 to installation space 35. As with the above-described installation space 35, passage part 37, which is a space extending through front end surface 39b of slider 3 in sliding direction D, is set to communicate with the installation space 35 and inlet 36 and have a gap approximately equal to the wire diameter of each inner cable 2B, and is configured such that each inner cable 2B can move to installation space 35 through inlet 36.

Note that in the present embodiment, a gap of a pair of guide parts 52 that makes up second restriction part 39 makes up passage part 37, and passage part 37 is provided to extend in the direction (the up-down direction in the present embodiment) perpendicular to the width direction (left-right direction) of slider 3 at a portion between installation space 35 and inlet 36 as described later for example.

First restriction part 38 is a portion for blocking the movement direction of inner cable 2B when inner cable 2B disposed at installation space 35 unexpectedly moves in the direction (the upward direction in the present embodiment, for example) parallel to the extending direction (up-down direction) of passage part 37. First restriction part 38 is provided on the side opposite to the bottom surface part 31 side, i.e., the upper side, in installation space 35, and for example, in the present embodiment, first restriction part 38 is composed of the pair of top plate parts 51 that extends from the upper end portion of the pair of side wall parts 32 toward the center portion of slider 3 in the width direction and forms the front end surface 39b of slider 3.

Here, as described above, first inner cable 2B1 and second inner cable 2B2 that make up inner cable 2B are disposed in installation space 35 in the state where they are separated from each other in the width direction (left-right direction), and the pair of top plate parts 51 that makes up first restriction part 38 are provided at respective locations at least on the upper side of these first inner cable 2B1 and second inner cable 2B2.

Further, when at least one of first inner cable 2B1 and second inner cable 2B2 unexpectedly moves upward in installation space 35, it makes contact with the end surface (the lower end surface in the present embodiment) on bottom surface part 31 side of top plate part 51, and the top plate part 51 functions as first restriction part 38.

Incidentally, the pair of top plate parts 51 is configured such that the gap between the end surfaces facing each other is set to be equal to or greater than the wire diameter of first inner cable 2B1 (or second inner cable 2B2), and the above-described inlet 36 is composed of the gap of the pair of top plate parts 51.

Second restriction part 39 is a portion for restricting the movement of inner cable 2B disposed in installation space 35 to passage part 37. Second restriction part 39 is provided adjacent to the above-described first restriction part 38, and is composed of the pair of guide parts 52, each of which is provided to extend in the direction (the downward direction in the present embodiment) perpendicular to the width direction of slider 3, from an protrusion end portion (i.e., an end portion on the side opposite to side wall part 32 side of the pair of top plate parts 51) of the pair of top plate parts 51 that makes up first restriction part 38 toward the bottom surface part 31 side, in the present embodiment, for example.

Further, for example, when an unexpected external force is applied to first inner cable 2B1 and second inner cable 2B2 disposed in installation space 35 in the state where they are separated from each other in the width direction (left-right direction), and first inner cable 2B1 (or second inner cable 2B2) is about to move to passage part 37 while being uplifted about second inner cable 2B2 (or first inner cable 2B1) as a fulcrum, the first inner cable 2B1 (or second inner cable 2B2) makes contact with the side surface on the side opposite to side wall part 32 of guide part 52, and thus the side surface functions as second restriction part 39.

Incidentally, the pair of guide parts 52 is set such that the gap between the side surfaces facing each other is approximately equal to the wire diameter of first inner cable. 2B1 (or second inner cable 2B2), and the above-described passage part 37 is composed of the gap of the pair of guide parts 52.

As illustrated in FIG. 2A, second cable end housing part 34b is formed in a recessed shape in communication with installation space 35 (see FIG. 2B), inlet 36, and passage part 37 at the front part of the top surface of slider 3. In addition, second cable end housing part 34b houses cable end 22B in the state where the rear end portion of first inner cable 2B1 and second inner cable 2B2 that make up inner cable 2B is disposed through installation space 35.

As illustrated in FIG. 2C, second cable end housing part 34b includes a pair of inner surfaces 32b provided on both sides in the width direction (left-right direction) and formed in side wall part 32, and the pair of inner surfaces 32b functions as third restriction part 40 that restricts the rotation of cable end 22B housed in second cable end housing part 34b.

That is, as described above, cable end 22B provided at inner cable 2B is composed of long coupling end 2B3 that couples first inner cable 2B1 and second inner cable 2B2 in the longitudinal direction, and cable end 22B is housed in second cable end housing part 34b with its longitudinal direction oriented in the width direction in the state where the rear end portions of first inner cable 2B1 and second inner cable 2B2 are disposed in installation space 35 in the state where they are separated in the width direction of slider 3. In this state, the pair of inner surfaces 32b are provided respectively facing the both end surfaces of housed cable end 22B in the longitudinal direction (the left-right direction in the present embodiment).

For example, when an unexpected external force is applied to cable end 22B through inner cable 2B, one end surface of cable end 22B in the longitudinal direction is uplifted and the cable end 22B acts to rotate, any of both end surfaces of cable end 22B in the longitudinal direction makes contact with inner surface 32b of second cable end housing part 34b in such a manner as to restrict the rotation of cable end 22B, and thus the inner surface 32b functions as third restriction part 40.

Procedure for Assembling Coupling Mechanism 1

Next, a procedure for assembling coupling mechanism 1 of the present embodiment is described with reference to FIGS. 1 to 3D. Note that the assembling procedure described below is merely an example, and is not limitative.

First, as illustrated in FIG. 1, joint case 4 is in a state where lid side member 42 is opened, and slider 3 is inserted to the housing space S of bottom side member 41 with sliding surface 31a (see FIG. 2B1 directed toward bottom surface 41a1 side of bottom side member 41. Here, while the position where slider 3 is inserted in housing space S may be any position in sliding direction D, it is desirable that the position is the vicinity of a center portion in sliding direction D for ensuring the operation space for coupling inner cables 2A and 2B to slider 3 later. In addition, in the present embodiment, slider 3 is inserted to housing space S with second coupling part 34 and first coupling part 33 directed forward and rearward, respectively, but this is not limitative, and may be appropriately changed in accordance with the usage of coupling mechanism 1. It is possible to insert slider 3 to housing space S with first coupling part 33 and second coupling part 34 directed forward and rearward, respectively.

After completion of insertion operation of slider 3 into housing space S, a coupling operation of slider 3 and inner cables 2A and 2B is performed. Here, while after inner cable 2A on one side is coupled to slider 3, inner cable 2B on the other side is coupled to slider 3 as described below in the present embodiment, this is not limitative, and inner cable 2A on one side may be coupled to slider 3 after inner cable 2B on the other side is coupled to slider 3.

The coupling operation of inner cable 2A on one side and slider 3 is performed in the following procedure. First, inner cable 2A is pulled out by a predetermined length from casing end 23A provided at an end portion (the front end portion in the present embodiment) of outer casing 21A. Next, the end portion (the front end portion in the present embodiment) of inner cable 2A pulled out from casing end 23A is inserted to first coupling part 33 of slider 3 from above, inner cable 2A is inserted to first passage part 33a as illustrated in FIG. 2A, cable end 22A is housed in first cable end housing part 33b, and the cable end 22A is engaged with end surface 39a of slider 3. In this manner, the end portion (front end portion) of inner cable 2A is coupled with slider 3.

Thereafter, as illustrated in FIG. 1, casing end 23A of outer casing 21A is inserted to first fixing part 41c1 of bottom side member 41 from above, and casing end 23A is engaged with first fixing part 41c1 through reduced diameter part 23A1. In this manner, the end portion of outer casing 21A is fixed to joint case 4, and the coupling operation of slider 3 and inner cable 2A on one side is completed.

Note that while casing end 23A of outer casing 21A is fixed to joint case 4 after the end portion (front d portion) of inner cable 2A is coupled with slider 3 in the present embodiment, this is not limitative. The end portion (front end portion) of inner cable 2A may be coupled with slider 3 after casing end 23A of outer casing 21A is fixed to joint case 4 in consideration of the efficiency of the operation and the like. In addition, after the end portion (front end portion) of inner cable 2A is coupled with slider 3, in accordance with the procedure described below, the end portion (rear end portion) of inner cable 2B may be coupled with slider 3 once, and then casing end 23A of outer casing 21A and casing end 23B of outer casing 21B may be collectively fixed to joint case 4.

After completion of the coupling operation of inner cable 2A on one side and slider 3, a coupling operation of inner cable 2B on the other side and slider 3 is performed. The coupling operation of inner cable 2B on the other side and slider 3 is performed in the following procedure. First, inner cable 2B is pulled out by a predetermined length from casing end 23B provided at the end portion (the rear end portion in the present embodiment) of outer casing B. Next, the end portion (the rear end portion in the present embodiment) of inner cable 2B pulled out from casing end 23B is inserted to second coupling part 34 of slider 3 from above, inner cable 2B is inserted to separation restraining part 34a, cable end 22B (coupling end 2B3) is housed in second cable end housing part 34b, and the cable end 22B (coupling end 2B3) is engaged with end surface 39b of slider 3 as illustrated in FIG. 2A. In this manner, the end portion (rear end portion) of inner cable 2B is coupled with slider 3.

Here, a procedure for inserting inner cable 2B to separation restraining part 34a is described in detail with reference to FIGS. 3A to 3D. In the present embodiment, as described above, two inner cables 2B (first inner cable 2B1 and second inner cable 2B2) are provided, and inner cables 2B are sequentially entered one by one into passage part 37 from inlet 36, and guided by the passage part 37 to installation space 35. More specifically, first, in the state where, out of two inner cables 2B, one inner cable 2B (first inner cable 2B1 in the present embodiment) is directed toward slider 3 side (the lower side in the present embodiment) with respect to the other inner cable (second inner cable 2B1 in the present embodiment), the first inner cable 2B1 is entered into passage part 37 from inlet 36.

Figure 3A:
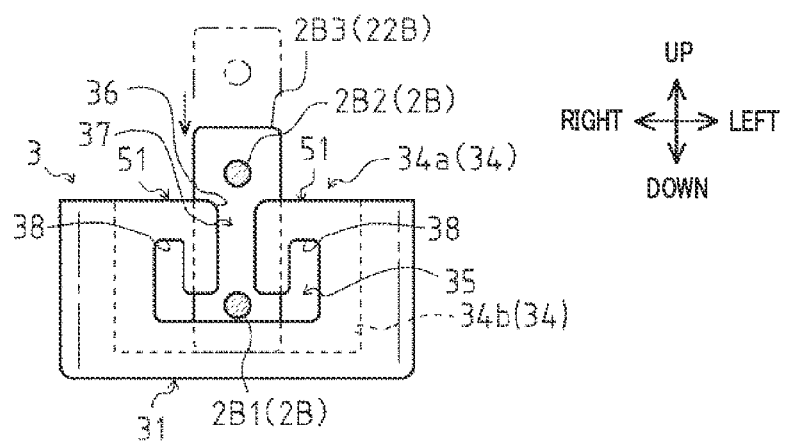
FIGS. 3A to 3D are diagrams illustrating an assembling procedure of the slider and the cable provided in the coupling mechanism of FIG. 1 on a time-series basis.

Next, first inner cable 2B1 entered into passage part 37 is moved to bottom surface part 31 side of slider 3 along the passage part 37 such that first inner cable 2B1 reaches installation space 35 as illustrated in FIG. 3A. Here, in the state where first inner cable 2B1 has reached installation space 35, second inner cable 2B2 is not yet entered into passage part 37, and is located in the vicinity of inlet 36.

Figure 3B:
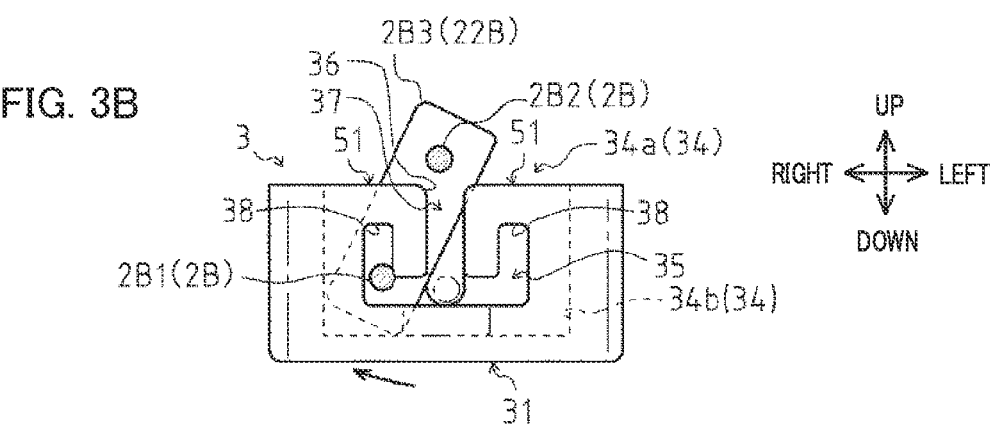

After first inner cable 2B1 has reached installation space 35, cable end 22B (coupling end 2B3) is rotated around the virtual axis parallel to sliding direction D (see FIG. 1) while it is slightly moved in the width direction of slider 3 (left-right direction) in second cable end housing part 34b as illustrated in FIG. 3B. In this manner, first inner cable 2B1 is moved in an arc-like trajectory toward the side separated away from passage part 37 (in the present embodiment, right side with respect to passage part 37), and second inner cable 2B2 is moved in an arc-like trajectory toward the side approaching inlet 36.

Figure 3C:
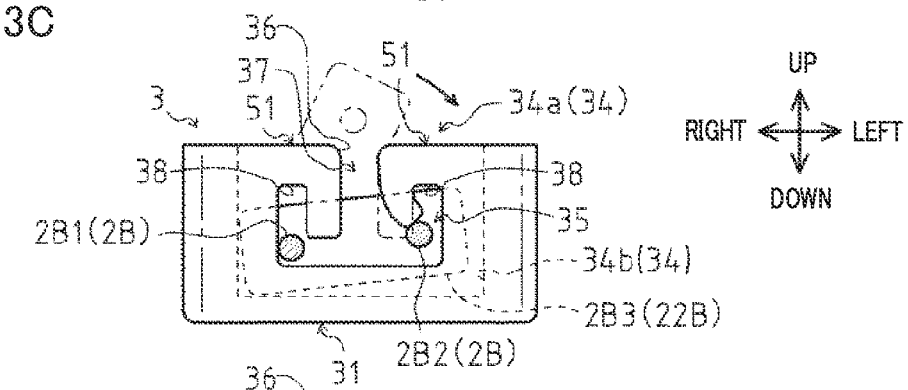

Thereafter, as illustrated in FIG. 3C, by further rotating cable end 22B (coupling end 2B3) around the axis of first inner cable 2B1 that has reached a position separated from passage part 37, second inner cable 2B2 is moved to installation space 35 while pressing the side surface of passage part 37 on one side (left side in the present embodiment) and being guided by the passage part 37. Note that slider 3 is formed of a member with elasticity such as resin, and the pair of guide parts 52 that makes up passage part 37 is configured to be bendable about the base part on top plate part 51 side as a fulcrum. As a result, second inner cable 2B2 is moved to installation space 35 while pressing the side surface of passage part 37 on one side (left side) and widening the gap of the passage part 37.

Figure 3D:
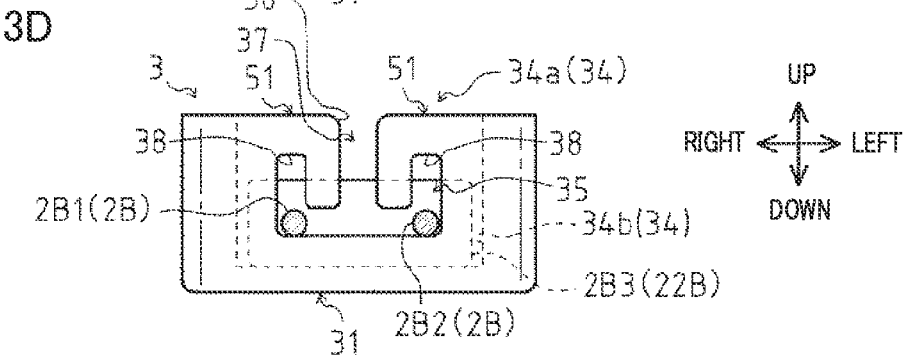

Further, as illustrated in FIG. 3D, when cable end 22B (coupling end 2B3) further rotates and second inner cable 2B2 is come off from passage part 37, first inner cable 2B1 and second inner cable 2B2 are disposed in installation space 35 in the state where they are separated from each other in the width direction (left-right direction).

As described above, installation space 35 that makes up separation restraining part 34*a* of slider 3 of the present embodiment is configured such that when one of first inner cable 2B1 and second inner cable 2B2 (for example, first inner cable 2B1) moves to passage part 37 through inlet 36 and it reaches a position separated from passage part 37 by the rotation of cable end 22B (coupling end 2B3) at second cable end housing part 34*b*, the other of first inner cable 2B1 and second inner cable 2B2 (for example, second inner cable 2B2) can move to installation space 35 from passage part 37. Further, when first inner cable 2B1 and second inner cable 2B2 are disposed in installation space 35 respectively, cable end 22B (coupling end 2B3) is engaged with end surface 39*b* of slider 3 and the end portion (rear end portion) of inner cable 2B is coupled with slider 3.

Thereafter, as illustrated in FIG. 1, casing end 23B of outer casing 21B is inserted to second fixing part 41*c*2 of bottom side member 41 from above, and casing end 23B is engaged with second fixing part 41*c*2 through reduced diameter part 23B1, in this manner, the end portion of outer casing 21B is fixed to joint case 4, and thus the coupling operation of slider 3 and inner cable 2B on the other side is completed.

Incidentally, the coupling operation of slider 3 and inner cables 2A and 2B may be performed before or after slider 3 is inserted to housing space S of bottom side member 41, but, when slider 3 is inserted to housing space S of bottom side member 41 in advance, the posture of slider 3 is held by bottom side member 41 and the subsequent coupling operation of slider 3 and inner cables 2A and 2B can be readily performed. Therefore, as described in the present embodiment, it is preferable to perform the coupling operation of slider 3 and inner cables 2A and 2B after slider 3 is inserted to housing space S of bottom side member 41.

When the coupling operation of slider 3 and inner cables 2A and 2B is completed, lid side member 42 is closed and engagement part 42*b* is engaged with engaged part 41*d* of bottom side member 41 so as to maintain the closed state of the lid side member 42. In this manner, at housing space S of bottom side member 41, the closed state with lid side member 42 is reliably maintained, and it is thus possible to prevent drop off of the slider 3 from joint case 4 due to an unexpected external force applied to slider 3 through inner cables 2A and 2B, for example. Upon completion of the operation of closing lid side member 42 at joint case 4, the assembling operation of coupling mechanism 1 is completed.

Configuration of Coupling Mechanism 101 of Other Embodiment

Next, a configuration of coupling mechanism 101 of the other embodiment is described with reference to FIGS. 4A to 5D. Coupling mechanism 101 of the other embodiment has a configuration substantially similar to that of the above-described coupling mechanism 1, and differs from the above-described coupling mechanism 1 in the configuration of fourth coupling part 134 provided on the other side (the front side in the present embodiment) of mainly slider 103. Therefore, in the following description, differences from the above-described coupling mechanism 1 are mainly described, and configurations similar to that of the coupling mechanism 1 are omitted.

Slider 103 includes sliding surface 131*a* that is slidable on bottom surface 141*a*1 of bottom side member 141 of joint case 104, and third coupling part 133 and fourth coupling part 134 are provided on one side (rear side) and the other side (front side) of the sliding surface 131*a*, respectively. Note that the above-mentioned joint case 104, sliding surface 131*a*, and third coupling part 133 have configurations similar to those of the above-described joint case 4, sliding surface 31*a*, and first coupling part 33 in coupling mechanism 1, and therefore descriptions thereof are omitted.

Fourth coupling part 134, which is an example of an embodiment of the present invention, engages with cable end 122B provided at the rear end portion of inner cable 102B, and couples the inner cable 102B to slider 103. Fourth coupling part 134 includes separation restraining part 134*a* that prevents inner cable 102B from coming off from slider 103, and third cable end housing part 134*b* that houses cable end 122B. Note that the above-mentioned inner cable 102B and cable end 122B have configurations similar to those of the above-described inner cable 2B and cable end 22B in coupling mechanism 1, and therefore descriptions thereof are omitted.

Figure 4A:
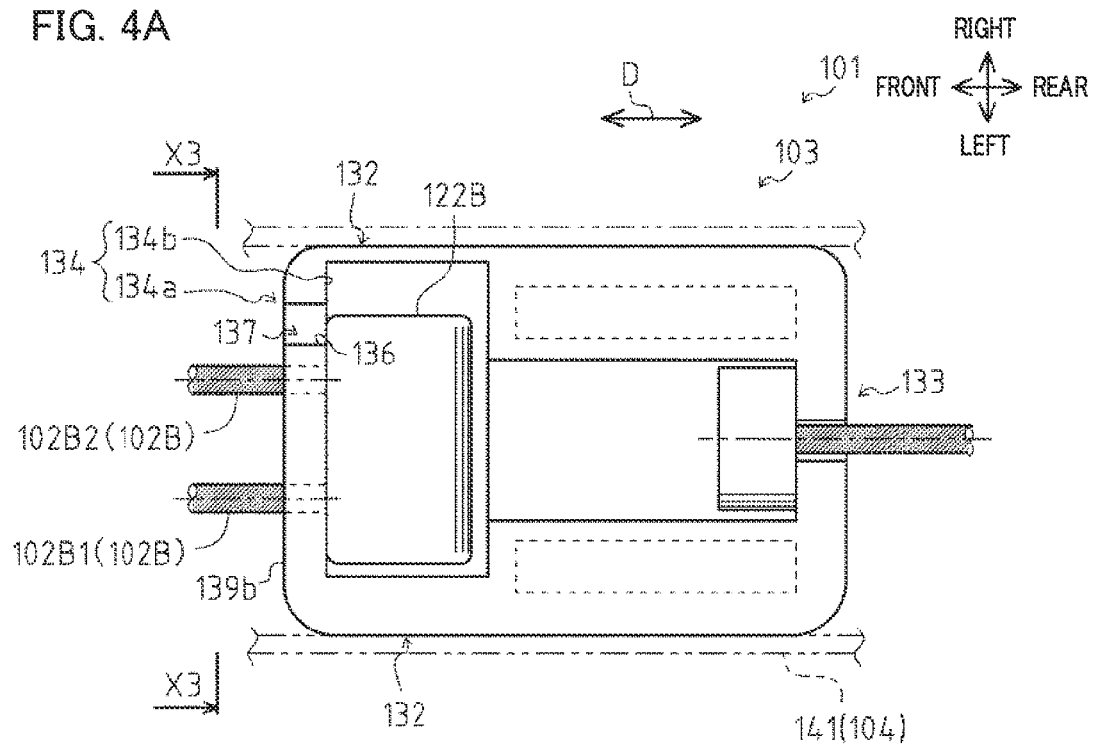
FIGS. 4A and 4B are diagrams illustrating a configuration of a slider provided in an coupling mechanism of the other embodiment.
Figure 4B:
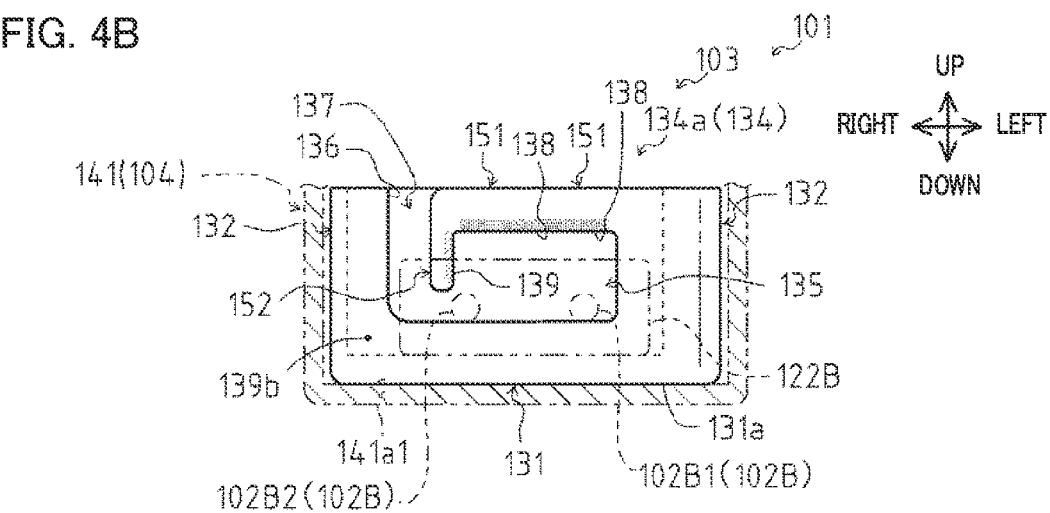

As illustrated in FIG. 4B, separation restraining part 134*a* is mainly composed of installation space 135, inlet 136, passage part 137, fourth restriction part 138, fifth restriction part 139 and the like. Note that the above-mentioned installation space 135, inlet 136, and passage part 137 have configurations similar to those of installation space 35, inlet 36, and passage part 37 of the above-described coupling mechanism 1, and therefore descriptions thereof are omitted.

Fourth restriction part 138 is a portion for blocking the movement direction of inner cable 2B when inner cable 102B disposed in installation space 135 unexpectedly moves toward the direction (for example, upward in the other embodiment) parallel to the extending direction (up-down direction) of passage part 137. Fourth restriction part 138 is provided on the side opposite to bottom surface part 131 side in installation space 135, i.e., the upper side. In the other embodiment, fourth restriction part 138 is composed of top plate part 151 that forms front end surface 139*b* of slider 103 and extends from the upper end portion of one (for example, the left one in the other embodiment) of a pair of side wall parts 132 toward the upper end portion of the other (for example, the right one in the other embodiment) side wall part 132, for example. Note that bottom surface part 131, side wall part 132, and end surface 139*b* have configurations similar to those of bottom surface part 31, side wall part 32, and end surface 39*b* in the above-described coupling mechanism 1, and therefore descriptions thereof are omitted.

Here, first inner cable 102B1 and second inner cable 2B2 that make up inner cable 102B are disposed in installation space 135 in the state where they are separated from each other in the width direction (left-right direction), and top plate part 151 that makes up fourth restriction part 138 is continuously provided at a location on the upper side of at least first inner cable 102B1 and second inner cable 102B2.

Further, when at least one of first inner cable 102B 1 and second inner cable 102B2 unexpectedly moves upward in installation space 135, it makes contact with the end surface (the lower end surface in the present embodiment) on bottom surface part 131 side in top plate part 151, and the top plate part 151 functions as fourth restriction part 138.

Incidentally, top plate part 151 is set such that the gap from side wall part 132 on the other side (right side) is equal to or greater than the wire diameter of first inner cable 102B1 (or second inner cable 102B2), and inlet 136 is composed of the gap between top plate part 151 and side wall part 132 on the other side (right side).

Fifth restriction part 139 is a portion for restricting the movement of inner cable 102B disposed in installation space 135 to passage part 137. Fifth restriction part 139 is provided adjacent to the above-described fourth restriction part 138, and in the other embodiment, fifth restriction part 139 is composed of guide part 152 provided to extend in the direction (the downward direction in the other embodiment) perpendicular to the width direction of slider 103, from the extending end portion (i.e., the end portion on the side opposite to side wall part 132 in top plate part 151) of top plate part 151 that makes up fourth restriction part 138 toward bottom surface part 131 side, for example.

Further, for example, when an unexpected external force is applied to first inner cable 102B1 and second inner cable 102B2 disposed in installation space 135 in the state where they are separated from each other in the width direction (left-right direction) and first inner cable 102B1 is about to move to passage part 137 while being uplifted about second inner cable 102B2 as a fulcrum, the first inner cable 102B1 makes contact with the side surface on the side opposite to passage part 137 side in guide part 152 and thus the side surface functions as fifth restriction part 139.

Incidentally, guide part 152 is set such that the gap from side wall part 132 on the other side (right side) is approximately equal to the wire diameter of first inner cable 102B1 (or second inner cable 102B2), and passage part 137 is composed of the gap between guide part 152 and side wall part 132 of the other side (right side).

Third cable end housing part 134b has a configuration substantially similar to that of second cable end housing part. 34b of the above-described coupling mechanism 1, but has a shape slightly extended to passage part 137 side to avoid interference with cable end 122B when coupling slider 3 and inner cable 102B as described later. Note that the shape of third cable end housing part 134b is not limited to that of the other embodiment, and may have a configuration similar to that of second cable end housing 34b by appropriately changing the design of the configuration of cable end 122B in inner cable 2B, for example.

Coupling mechanism 101 of the other embodiment with the above-described configuration is assembled in a procedure substantially similar to that of the above-described coupling mechanism 1, and coupling mechanism 101 of the other embodiment is different from the above-described coupling mechanism 1 in the procedure of inserting inner cable 102B to separation restraining part 134a. Here, awhile a procedure of inserting inner cable 102B to separation restraining part 134a is described below with reference to FIGS. 5A to 5D, other operation procedures are similar to those of the above-described coupling mechanism 1, and therefore descriptions thereof are omitted.

First, in the state where one of two inner cables 102B (first inner cable 102B1 in the other embodiment) is directed toward slider 103 side (the lower side in the other embodiment) with respect to the other inner cable (second inner cable 102B1 in the other embodiment), the first inner cable 102B1 is entered into passage part 137 from inlet 136.

Figure 5A:
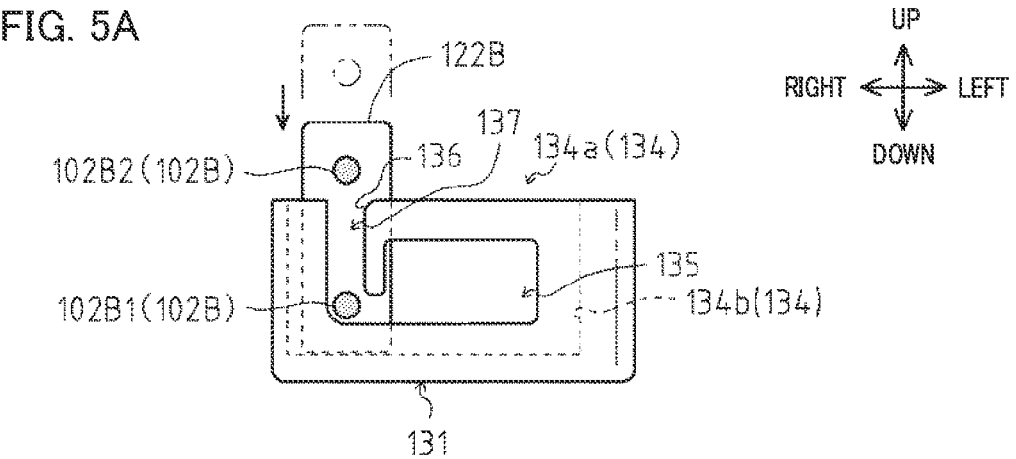
FIGS. 5A to 5D are diagrams illustrating an assembling procedure of the slider and the cable provided in the coupling mechanism of FIG. 4 on a time-series basis.

Next, first inner cable 102B1 entered into passage part 137 is moved to bottom surface part. 131 side of slider 103 along the passage part 137 such that first inner cable 102B1 reaches installation space 135 as illustrated in FIG. 5A. Here, in the state where first inner cable 102B1 has reached installation space 135, second inner cable 102B2 is not yet entered into passage part 137 and is located in the vicinity of inlet 136.

Figure 5B:
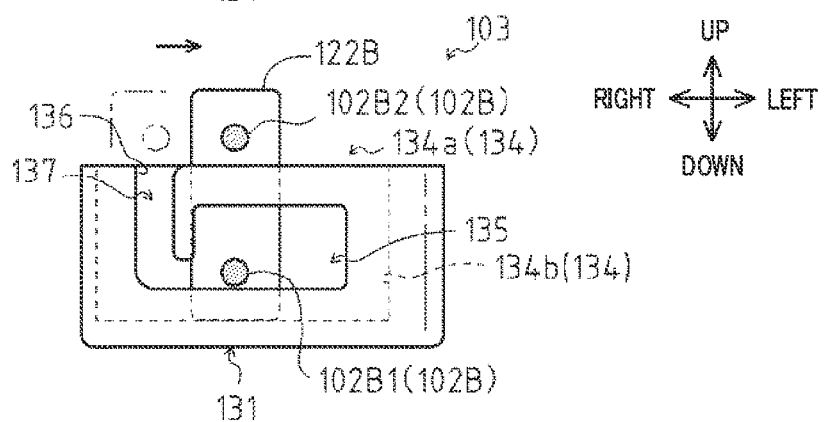

After first inner cable 102B1 has reached installation space 135, cable end 122B is moved to the side (the left side in the other embodiment) separated away from passage part 137 in the width direction of slider 3 in third cable end housing part 134b as illustrated in FIG. 5B such that first inner cable 102B1 reaches an approximate center portion in the width direction in installation space 135.

Thereafter, cable end 122B is rotated around the virtual axis parallel to sliding direction D (see FIG. 4A) while it is further moved in the width direction (left direction) of slider 3 in second cable end housing part 34b. In this manner, first inner cable 102B1 is moved in an arc-like trajectory toward the side (left side) separated away from passage part 137, and second inner cable 102B2 is moved in an arc-like trajectory toward the side approaching inlet 136.

Figure 5C:
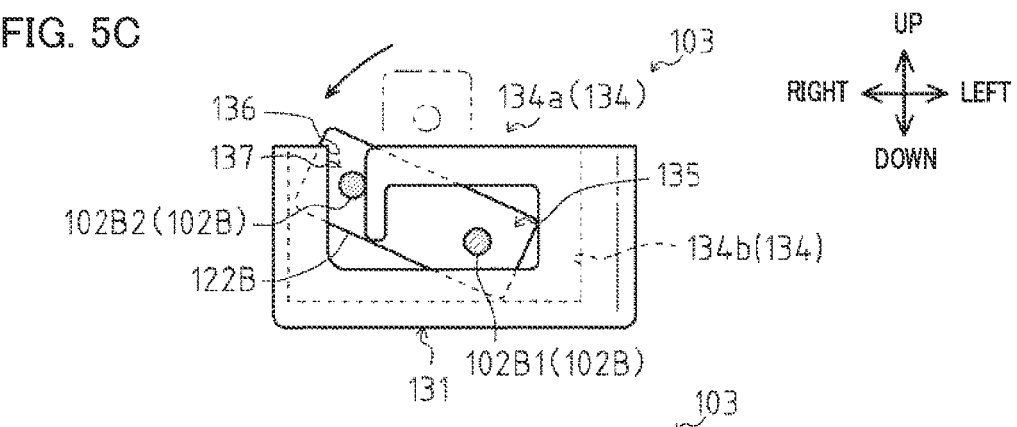

Then, as illustrated in FIG. 5C, cable end 122B is further rotated around the axis of first inner cable 102B1 that has reached a position separated from passage part 137, and thus second inner cable 102B2 is moved to installation space 135 while, being guided by passage part 137.

Figure 5D:
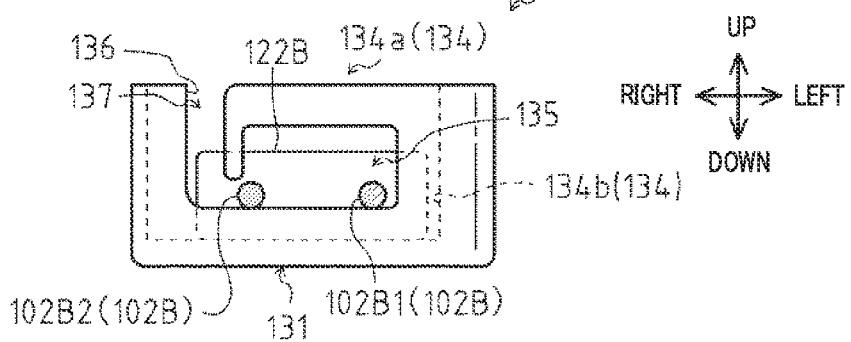

Thereafter, as illustrated in FIG. 5D, when cable end 122B is further rotated and second inner cable 102B2 is come off from passage part 137, first inner cable 102B1 and second inner cable 102B2 are disposed in installation space 135 in the state where they are separated from each other in the width direction (left-right direction).

As described above, as with installation space 135 of the above-described coupling mechanism 1, installation space 135 of the other embodiment is configured such that when one (for example, first inner cable 102B1) of first inner cable 102B1 and second inner cable 102B2 moves through passage part. 137 through inlet 136 and it reaches a position separated from passage part 137 by the rotation of cable end 122B at third cable end housing part 134b, the other (for example, second inner cable 102B2) of first inner cable 102B1 and second inner cable 102B2 can move to installation space 135 from passage part 137. When first inner cable 102B1 and second inner cable 102B2 are disposed in installation space 135 respectively, cable end 122B is engaged with end surface 139b of slider 103 (see FIG. 4A) and the end portion (rear end portion) of inner cable 102B is coupled with slider 103.

Effects

As described above, coupling mechanism 1 of the present embodiment (or coupling mechanism 101) is a coupling mechanism including inner cable 2B (or inner cable 102B) including cable end 22B (or cable end 122B) at an end portion, slider 3 (or slider 103) including second coupling part 34 (or fourth coupling part 134) that couples with the end portion of inner cable 2B (inner cable 102B), and joint case 4 (or joint case 104) including housing space S that houses slider 3 (slider 103) in a slidable manner. In addition, second coupling part 34 (fourth coupling part 134) includes second cable end housing part 34b (or third cable end housing part 134b) that houses cable end 22B (cable end 122B), and separation restraining part 34a (or separation restraining part 134a) that restrains separation of inner cable 2B (inner cable 102B) from slider 3 (slider 103). Further, separation restraining part 34a (separation restraining part 134a) includes installation space 35 (or installation space 135), inlet 36 (or inlet 136), passage part 37 (or passage part 137), and first restriction part 38 (or fourth restriction part 138). Here, installation space 35 (installation space 135) is a space extending in sliding direction D of slider 3 (slider 103), and a space in which inner cable 2B (inner cable 102B) extended from cable end 22B (or cable end 122B) is disposed in the state where inner cable 2B (inner cable 102B) is coupled with slider 3 (slider 103). In addition, inlet 36 (inlet 136) is a gap that opens with a gap equal to or greater than the wire diameter of the inner cable 2B (inner cable 102B) in the direction perpendicular to the axis of inner cable 2B (inner cable 102B), and allows inner cable 2B (inner cable 102B) to pass through it by moving it in the direction perpendicular to the axis. In addition, passage part 37 (passage part 137) is a space communicated with installation space 35 (installation space 135) and inlet 36 (inlet 136), and is a space in which inner cable 2B (inner cable 102B) can move to the installation space 35 (installation space 135) through inlet 36 (inlet 136). Further, first restriction part 38 (fourth restriction part 138) is a part that blocks the movement direction of inner cable 2B (inner cable 102B) when inner cable 2B (inner cable 102B) disposed in installation space 35 (installation space 135) moves in the direction parallel to the extending direction of passage part 37 (or passage part 137).

In this manner, in coupling mechanism 1 of the present embodiment (or coupling mechanism 101 of the other embodiment), the gap of inlet 36 (inlet 136) is set to be equal to or greater than the wire diameter of inner cable 2B (inner cable 102B), and thus, when the end portion of inner cable 2B (inner cable 102B) is pushed into installation space 35 (installation space 135) from the inlet 36 (inlet 136), it can be smoothly guided to passage part 37 (passage part 137) through inlet 36 (inlet 136). As a result, the end portion of the inner cable 2B (inner cable 102B) can be readily coupled with slider 3 (slider 103) while preventing buckling and the like at the end portion of inner cable 2B (inner cable 102B). In addition, after the end portion of inner cable 2B (inner cable 102B) is disposed in installation space 35 (installation space 135), first restriction part 38 (fourth restriction part 138) can prevent the end portion of the inner cable 2B (inner cable 102B) from moving to the side opposite to sliding surface 31a (sliding surface 131a) side of joint case 4 (joint case 104) and from being dropped from slider 3 (slider 103).

In addition, in coupling mechanism 1 of the present embodiment (or coupling mechanism 101), separation restraining part 34a (separation restraining part 134a) includes second restriction part 39 (or fifth restriction part 139) adjacent to first restriction part 38 (fourth restriction part 138), and configured to restrict the movement of inner cable 2B (inner cable 102B) disposed in installation space 35 (installation space 135) to passage part 37 (passage part 137).

With the above-mentioned configuration, second restriction part 39 (or fifth restriction part 139) can prevent the end portion of inner cable 2B (inner cable 102B) disposed in installation space 35 (installation space 135) from again passing through passage part 37 (passage part 137) and from being dropped from slider 3 (slider 103) through inlet 36 (inlet 136).

In addition, in coupling mechanism 1 (or coupling mechanism 101) of the present embodiment, inner cable 2B (inner cable 102B) includes first inner cable 2B1 (or first inner cable 102B1) and second inner cable 2B2 (or second inner cable 102B2) disposed parallel to each other, and coupling end 2B3 that couples first inner cable 2B1 (first inner cable 102B1) and second inner cable 2B2 (second inner cable 102B2). Further, installation space 35 (installation space 135) is configured such that when, out of first inner cable 2B1 (first inner cable 102B1) and second inner cable 2B2 (second inner cable 102B2), one inner cable 2B (inner cable 102B) moves through passage part 37 (passage part 137) through inlet 36 (inlet 136) and it reaches a position separated from passage part 37 (passage part 137) by a rotation of coupling end 2B3 at second cable end housing part 34b (third cable end housing part 134b), out of first inner cable 2B1 (first inner cable 102B1) and second inner cable 2B2 (second inner cable 102B2), the other inner cable 2B (inner cable 102B) can move from passage part 37 (passage part 137) to installation space 35 (installation space 135).

With the above-mentioned configuration, even with a plurality of (two) inner cables 2B (inner cable 102B), it is easy to perform the coupling with second coupling part 34 (fourth coupling part 134) of slider 3 (slider 103).

In addition, in coupling mechanism 1 of the present embodiment, coupling end 2B3 that couples first inner cable 2B1 and second inner cable 2B2 is long cable end 22B that couples first inner cable 2B1 and second inner cable 2B2 in the longitudinal direction, and second coupling part 34 includes third restriction part 40 that restricts the rotation by making contact with the both end surfaces of the cable end 22B in the longitudinal direction when cable end 22B is rotated in the state where the end portions of first inner cable 2B1 and second inner cable 2B2 are extended through and disposed in installation space 35.

With the above-mentioned configuration, for example, even when external forces are applied to first inner cable 2B1 and second inner cable 2B2 from directions three-dimensionally different from each other, third restriction part 40 can limit the fluttering of cable end 22B. It is thus possible to prevent a situation where first inner cable 2B1 and second inner cable 2B2 move in a twisted direction (for example, a direction in which one of first inner cable 2B1 and second inner cable 2B2 is rotated around the other of first inner cable 2B1 and second inner cable 2B2) together with the cable end 22B, and first inner cable 2B1 and second inner cable 2B2 unexpectedly pass through passage part 37 and dropped from slider 3 through inlet 36.

In addition, in coupling mechanism 1 of the present embodiment, separation restraining part 34a includes bottom surface part 31 on the bottom part side of joint case 4 and the pair of side wall parts 32 provided in the direction perpendicular to the extending direction of inner cable 2B, and bottom surface part 31 and the pair of side wall parts 32 partition installation space 35. First restriction part 38 is composed of the pair of top plate parts 51 provided on the side opposite to bottom surface part 31 side of installation space 35, inlet 36 is composed of the gap of the pair of top plate parts 51, and passage part 37 is composed of the gap of the pair of guide parts 52 on the side opposite to side wall part 32 at the pair of top plate parts 51.

With the above-mentioned configuration, with the pair of top plate parts 51 extended from the end portion of side wall part 32, both the function of first restriction part 38 and the function of inlet 36 can be achieved, and the configuration of second coupling part 34 can be simplified.

REFERENCE SIGNS LIST 1, 101 Coupling mechanism
2A, 2B, 102B Inner cable
2B1, 102B1 First inner cable
2B2, 102B2 Second inner cable 2B3 Coupling end
3, 103 Slider
4, 104 Joint case
21A Outer casing
22A, 22B, 122B Cable end
22A1 End surface
23A1, 23B1 Reduced diameter part
31, 131 Bottom surface part
31a, 131a Sliding surface
32, 132 Side Tall part
32a Contact surface
32b Inner surface
33 First coupling part
33a First passage part
33h First cable end housing part
34 Second coupling part
34a, 134a Separation restraining part
34b, 134h Second cable end housing part
35, 135 Installation space
36, 136 Inlet
37, 137 Passage part
38 First restriction part
39 Second restriction part
39a, 39b, 139b End surface
40 Third restriction part
41, 141 Bottom side member
41a, 141a Bottom part
41a1 Bottom surface
41b Side wall part
41c End wall part
41c1 First fixing part
41c2 Second fixing part
41d Engaged part
42 Lid side member
42a Lid part
42a1 Lid surface
42b Engagement part
43 Hinge
51, 151 Top plate part
52, 152 Guide part
133 Third coupling part
134 Fourth coupling part
138 Fourth restriction part
139 Fifth restriction part
D Sliding direction.
S Housing space

What is claimed is:

1. A coupling mechanism, comprising:
a cable including a cable end at an end portion of the cable;
a slider including a coupling part configured to be coupled with the end portion of the cable; and
a joint case including a housing space configured to house the slider in a slidable manner,
wherein the coupling part includes:
a cable end housing part configured to house the cable end, and
a separation restraining part configured to restrain separation of the cable from the slider,
wherein the separation restraining part includes:
an installation space extended in a sliding direction of the slider, the installation space being a space in which the cable extended from the cable end is disposed in a state where the cable is coupled with the slider,
an inlet configured to open in a direction perpendicular to an axis of the cable with a gap equal to or greater than a wire diameter of the cable, and allow the cable to move in the direction perpendicular to the axis and to pass through the inlet,
a passage part communicated with the installation space and the inlet, and configured to allow the cable to move to the installation space through the inlet, and
a first restriction part configured to block a movement direction of the cable when the cable disposed in the installation space moves in a direction parallel to an extending direction of the passage part, wherein
the cable includes:
a first cable and a second cable disposed parallel to each other, and
a coupling end configured to couple the first cable and the second cable; and
wherein the installation space is configured such that when one of the first cable and the second cable moves through the passage part through the inlet and reaches a position separated from the passage part by a rotation of the coupling end at the cable end housing part, the other of the first cable and the second cable is allowed to move from the passage part to the installation space.

2. The coupling mechanism according to claim 1, wherein the separation restraining part includes a second restriction part adjacent to the first restriction part and configured to restrict a movement of the cable disposed in the installation space to the passage part.

3. The coupling mechanism according to claim 1,
wherein the coupling end that couples the first cable and the second cable is a long cable end that couples the first cable and the second cable in a longitudinal direction; and
wherein the coupling part further includes a third restriction part configured to restrict a rotation by making contact with both end surfaces of the cable end in the longitudinal direction when the cable end is rotated in a state where end portions of the first cable and the second cable are extended through and disposed in the installation space.

4. The coupling mechanism according to claim 1,
wherein the separation restraining part includes a bottom surface part on a bottom part side of the joint case and a pair of side wall parts provided in a direction perpendicular to an extending direction of the cable, the bottom surface part and the pair of side wall parts partitioning the installation space;
wherein the first restriction part includes a pair of top plate parts provided on a side opposite to the bottom surface part side of the installation space;
wherein the inlet includes a gap of the pair of top plate parts; and
wherein the passage part includes a gap of a pair of guide parts provided on a side opposite to the side wall part, the pair of guide parts being respectively provided at the pair of top plate parts.

* * * * *